(12) United States Patent
Liu et al.

(10) Patent No.: US 12,104,989 B1
(45) Date of Patent: Oct. 1, 2024

(54) SAMPLING DEVICE AND SAMPLE STORAGE DEVICE SUITABLE FOR SINGLE MOLECULE

(71) Applicant: Shandong Provincial Hospital, Jinan (CN)

(72) Inventors: Xiangdong Liu, Jinan (CN); Mingjie Yuan, Jinan (CN); Hengyan Li, Jinan (CN)

(73) Assignee: Shandong Provincial Hospital, Jinan (CN)

( * ) Notice: Subject to any disclaimer, the term of this patent is extended or adjusted under 35 U.S.C. 154(b) by 0 days.

(21) Appl. No.: 18/409,837

(22) Filed: Jan. 11, 2024

(51) Int. Cl.
*G01N 1/10* (2006.01)
*B01D 17/02* (2006.01)

(52) U.S. Cl.
CPC ........... *G01N 1/10* (2013.01); *B01D 17/0217* (2013.01)

(58) Field of Classification Search
CPC ...... G01N 1/10; G01N 1/00; G01N 2001/002; G01N 1/2214; G01N 1/2247; G01N 2001/2264; G01N 2001/2826; B01D 17/0217
See application file for complete search history.

(56) References Cited

U.S. PATENT DOCUMENTS

| | | | |
|---|---|---|---|
| 2008/0087613 A1 | 4/2008 | Hudock et al. | |
| 2010/0320088 A1 | 12/2010 | Fouillet et al. | |
| 2012/0120392 A1* | 5/2012 | Ewing | G01N 1/405 356/311 |
| 2012/0198912 A1* | 8/2012 | Ewing | G01N 1/22 73/23.35 |
| 2023/0064876 A1* | 3/2023 | Berndt | G01N 1/2205 |

* cited by examiner

*Primary Examiner* — Peter J Macchiarolo
*Assistant Examiner* — Anthony W Megna Fuentes
(74) *Attorney, Agent, or Firm* — JMB Davis Ben-David

(57) ABSTRACT

Provided herein is a sampling device and sample storage device suitable for a single molecule is provided in this application, and includes a sample collector, where the sample collector is used for collecting a single-molecule sample from a target solvent, and the sample collector includes a first sample collector and a second sample collector, where the first sample collector is used for collecting a first sample, the second sample collector is used for collecting a second sample, and the relative molecular mass of the first sample is different from that of the second sample.

9 Claims, 2 Drawing Sheets

Sampling device and sample storage device suitable for single molecule 1000

Sample collector 1100
- First sample collector 1110
- Second sample collector 1120

Sample storage device 1200
- First memory 1210
- Second memory 1220

Controller 1300

SAMPLING DEVICE AND SAMPLE STORAGE DEVICE SUITABLE FOR SINGLE MOLECULE

CROSS-REFERENCE TO RELATED APPLICATION

This application claims the benefit of priority to Chinese Patent Application No. 202310886257.0, filed Jul. 19, 2023, the contents of which are incorporated by reference herein in their entirety.

TECHNICAL FIELD

This application relates to the field of a sampling device, and in particular, to a sampling device and sample storage device suitable for a single molecule.

BACKGROUND

With the development of science, examination of physical health has been closely related to life, where blood is a tissue that circulates within the heart and vascular cavity. Adult blood accounts for about one thirteenth of body weight, with a relative density of 1.050-1.060, a pH value of 7.3-7.4, and an osmotic pressure of 313 mm/L. Blood consists of plasma and blood cells. Plasma contains plasma proteins (albumin, globulin, and fibrinogen), lipoproteins, and other nutrients, as well as inorganic salts, oxygen, hormones, enzymes, antibodies, and cellular metabolites. Blood cells include red blood cells, white blood cells, and blood platelets. Physiological and pathological changes in the body often cause changes in blood composition, so the detection of blood composition has important clinical significance. The structure of individual macromolecules formed by proteins within human plasma is closely related to the level of human health. The relative molecular mass of specific proteins and the mass fraction of the specific proteins in body fluid are closely related to human health. At the same time, a proportional relationship of different protein molecules may also indicate some diseases.

When the structure of macromolecules in body fluid is analyzed, a single type of molecules is usually sampled every time because a molecular structure is relatively small and a sample layer is formed by centrifugation for preservation. However, on the premise of a same rotating speed, since different samples have different molecular masses, a large amount of samples with a relatively large relative molecular mass in a sample layer formed by different samples are precipitated due to the centrifugal force. A proportional relationship between amounts of different molecules in body fluid cannot be kept in sampling results, such that some information is prone to omit during biochemical analysis.

SUMMARY

Therefore, A sampling device and sample storage device suitable for a single molecule is provided in this application, to improve the above problems.

A sampling device and sample storage device suitable for a single molecule is provided in this application, and includes:

a sample collector, where the sample collector is used for collecting a single-molecule sample from a target solvent, and the sample collector includes a first sample collector and a second sample collector, where the first sample collector is used for collecting a first sample, the second sample collector is used for collecting a second sample, and the relative molecular mass of the first sample is different from that of the second sample;

the sample storage device, where the sample storage device is used for storing the single-molecule sample collected by the sample collector, the sample storage device includes a first memory and a second memory that are capable to rotate, where the first memory is connected to the first sample collector and used for storing the first sample, and the second memory is connected to the second sample collector and used for storing the second sample; and a controller, wherein the controller is used for obtaining the relative molecular mass of the first sample and that of the second sample, and controlling the rotating speed of the first memory and that of the second memory according to the relative molecular mass of the first sample and that of the second sample.

In this application, the first sample collector and the second sample collector can collect two different samples, and the first sample and the second sample are preserved in the first memory and the second memory, respectively. The controller controls the rotating speed of the first memory and that of the second memory, such that the first memory and the second memory have different centrifugal speeds for different samples. A proportional relationship between the first sample and the second sample is saved while the samples are retained.

In some feasible embodiments, the first sample collector includes a housing and a liquid inlet pipe, an absorption chamber for storing a solvent is formed in the housing, the liquid inlet pipe is communicated with the target solvent and the absorption chamber, the liquid inlet pipe includes a dispersion part, and the dispersion part is located in the absorption chamber.

It can be understood that in the embodiment, the first sample collector can perform collection by an enrichment sampling method via a specific solution. The target solvent can be led to a specific sampling solvent through the liquid inlet pipe, such that the first sample can be retained in the sampling solvent. The dispersion part being arranged in the absorption chamber can further cause the first sample to be diffused relatively uniformly, which improves the absorption efficiency of a specific solvent.

In some feasible embodiments, the sampling device further includes a negative pressure device, and the negative pressure device includes a liquid suction pipe, and the liquid suction pipe is communicated with the absorption chamber.

It can be understood that negative pressure device can form a negative pressure in the absorption chamber, such that the target solvent can enter the absorption chamber. In this application, the negative pressure device may include a vacuum bottle or a vacuum pump. This is not specifically limited herein.

In some feasible embodiments, the first memory includes a plurality of first storage bins and a first rotary table, where the plurality of first storage bins are uniformly spaced on an edge of the first rotary table, and each of the first storage bins is selectively communicated with the first sample collector; and the second memory includes a plurality of second storage bins and a second rotary table, where the plurality of second storage bins are uniformly spaced on an edge of the second rotary table, and each of the second storage bins is selectively communicated with the second sample collector.

In some feasible embodiments, the controller is also used for controlling connection of the first storage bin and the first sample collector; and when the mass fraction of the first sample in a solvent in the absorption chamber reaches a preset threshold, the controller controls separation of the first storage bin from the first sample collector.

It can be understood that when the mass fraction of a first sample in one of the first storage bins reaches a preset threshold, this means that the first sample therein has been preserved, and therefore a next first storage bin can be replaced under the control of the controller to continue sampling.

In some feasible embodiments, the first memory includes a first servo motor, the first servo motor is in transmission connection with the first rotary table, and the controller is used for controlling the rotating speed of the first servo motor; and the second memory includes a second servo motor, the second servo motor is in transmission connection with the second rotary table, and the controller is also used for controlling the rotating speed of the second servo motor.

It can be understood that in the embodiment, the rotation of two rotary tables is controlled through two different servo motors, which can separately adjust the rotating speeds of the two rotary tables.

In some feasible embodiments, the diameter of the first rotary table is the same as that of the second rotary table, the ratio of the relative molecular mass of the first sample to that of the second sample is N, and the ratio of the rotating speed of the first rotary table to that of the second rotary table is 1/N.

In some feasible embodiments, the sampling device and sample storage device further includes:
  a driving motor, where the driving motor is in transmission connection with the first rotary table; and
  a transmission structure, where the transmission structure includes an input end and an output end, the input end is in transmission connection with the first rotary table and the output end is in transmission connection with the second rotary table, and the controller is also used for controlling the transmission ratio of the output end to the input end.

In some feasible embodiments, the ratio of the relative molecular mass of the first sample to that of the second sample is N, the transmission ratio of the output end to the input end is 1/1, and the ratio of the rotating speed of the first rotary table to that of the second rotary table is 1/N.

In some feasible embodiments, the diameter of the first rotary table is the same as that of the second rotary table, the ratio of the relative molecular mass of the first sample to that of the second sample is N, and the transmission ratio of the input end to the output end is 1/N.

Compared with the prior art, this application has the following advantages:

In this application, the first sample collector and the second sample collector can collect two different samples, and the first sample and the second sample are preserved in the first memory and the second memory, respectively. The controller controls the rotating speed of the first memory and that of the second memory, such that the first memory and the second memory have different centrifugal speeds for different samples. A proportional relationship between the first sample and the second sample is saved while the samples are retained.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts.

DESCRIPTION OF EMBODIMENTS

Figure 1:
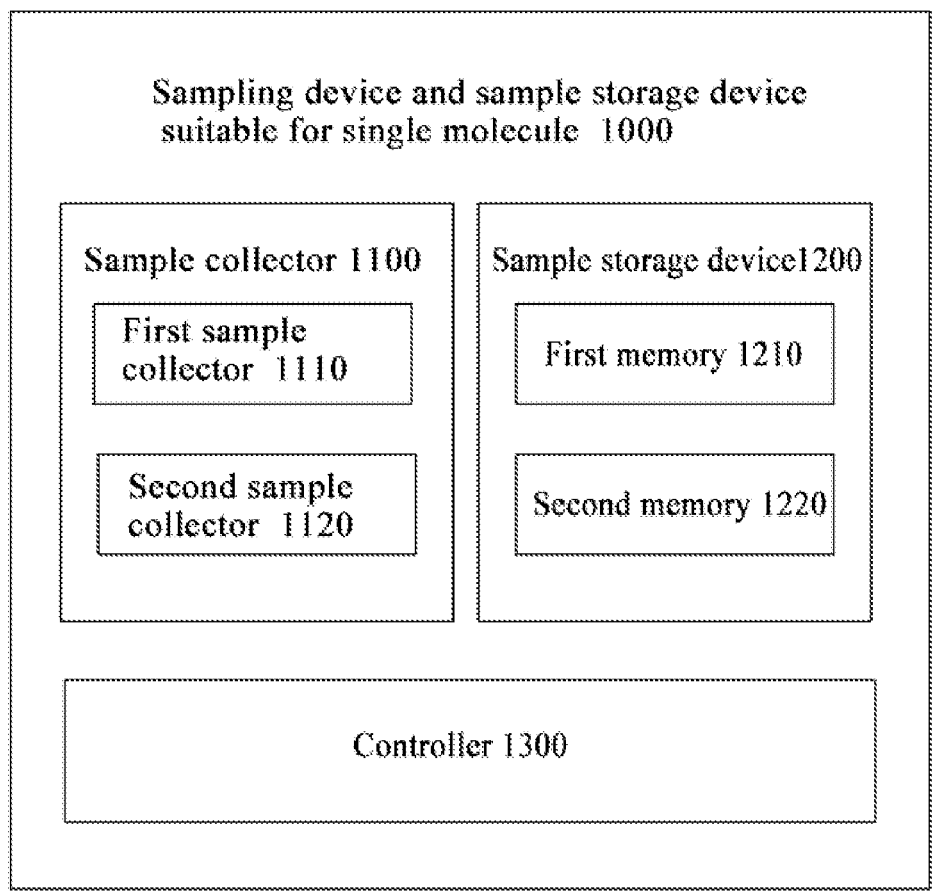
FIG. 1 is a structural block diagram of a sampling device and sample storage device suitable for a single molecule according to an embodiment of this application.

To make the above objectives, features and advantages of this application more obvious and easier to understand, the following further describes this application in detail with reference to the accompanying drawings and embodiments. Apparently, the described embodiments are some but not all embodiments of this application. All other embodiments obtained by a person of ordinary skill in the art based on the embodiments of this application without creative efforts shall fall within the protection scope of this application.

It should be noted that terms "comprise", "include", or any other variations thereof herein are intended to cover a non-exclusive inclusion, such that an article or a device including a list of elements not only includes those elements but also includes other elements that are not expressly listed, or further includes elements inherent to such article or device. In absence of more constraints, an element preceded by the statement "includes a . . . " does not preclude existence of identical elements in the article, or device that includes the element.

In this application, unless otherwise specified or defined explicitly, the terms "mount", "connect", and "fasten" should be understood in their general senses. For example, they may refer to a fixed connection, a detachable connection, or an integral connection, may refer to a mechanical connection or electrical connection, may refer to a direct connection, an indirect connection via an intermediate medium, or an interaction between two elements, or may refer to a surface contact or a surface contact connection via an intermediate medium. A person of ordinary skills in the art can understand specific meanings of these terms in this application as appropriate to specific situations.

In addition, the terms "first", "second", and the like are merely intended for distinguishing purposes and shall not be understood as specified or special structures. Terms "some embodiments", "other embodiments", and the like means that the specific features, structures, materials, or characteristics described with reference to the embodiment or the example are included in at least one embodiment or example of this application. In this application, schematic representations of the above terms are not necessarily aimed at the same embodiment or example. Moreover, the specific features, structures, materials, or characteristics described herein may be combined in a suitable manner in any one or more of embodiments or examples. In addition, in absence of conflicts, a person of ordinary skills in the art can integrate and combine different embodiments or examples and features of different embodiments or examples described in this application.

With the development of science, examination of physical health has been closely related to life, where blood is a tissue that circulates within the heart and vascular cavity. Adult blood accounts for about one thirteenth of body weight, with a relative density of 1.050-1.060, a pH value of 7.3-7.4, and an osmotic pressure of 313 mm/L. Blood consists of plasma and blood cells. Plasma contains plasma proteins (albumin, globulin, and fibrinogen), lipoproteins, and other nutrients, as well as inorganic salts, oxygen, hormones, enzymes, antibodies, and cellular metabolites. Blood cells include red blood cells, white blood cells, and blood platelets. Physiological and pathological changes in the body often cause changes in blood composition, so the detection of blood composition has important clinical significance. The structure of individual macromolecules formed by proteins within human plasma is closely related to the level of human health. The relative molecular mass of specific proteins and the mass fraction of the specific proteins in body fluid are closely related to human health. At the same time, a proportional relationship of different protein molecules may also indicate some diseases.

Therefore, a sampling device and sample storage device 1000 suitable for a single molecule is provided in this application, to improve the above problems.

Embodiment 1

A sampling device and sample storage device suitable for a single molecule 1000 is provided in this application, and includes:

- a sample collector 1100, where the sample collector 1100 is used for collecting a single-molecule sample from a target solvent, and the sample collector 1100 includes a first sample collector 1110 and a second sample collector 1120, where the first sample collector 1110 is used for collecting a first sample, the second sample collector 1120 is used for collecting a second sample, and the relative molecular mass of the first sample is different from that of the second sample;
- the sample storage device 1200, where the sample storage device 1200 is used for storing the single-molecule sample 1100 collected by the sample collector, the sample storage device 1200 includes a first memory 1210 and a second memory 1220 that are capable of rotate, where the first memory 1210 is connected to the first sample collector 1110 and used for storing the first sample, and the second memory 1220 is connected to the second sample collector 1120 and used for storing the second sample; and
- a controller 1300, where the controller 1300 is used for obtaining the relative molecular mass of the first sample and that of the second sample, and controlling the rotating speed of the first memory 1210 and that of the second memory 1220 according to the relative molecular mass of the first sample and that of the second sample.

It can be understood that in this application, the first sample collector 1110 and the second sample collector 1120 can collect two different samples, and the first sample and the second sample are preserved in the first memory 1210 and the second memory 1220, respectively. The controller 1300 controls the rotating speed of the first memory 1210 and that of the second memory 1220, such that the first memory and the second memory have different centrifugal speeds for different samples. A proportional relationship between the first sample and the second sample is saved while the samples are retained.

It can be understood that when the first sample and the second sample are preserved in a centrifugation way, the first sample and the second sample can be preserved in a solvent in the first memory 1210 or the second memory 1220, and the location of the solvent is divided into a solvent layer and a sample layer enriched with a sample under the action of centrifugal force, and both the first sample and the second sample are preserved in the sample layer. The specific thickness of the sample layer is related to an amount of solvent preserved in the first memory 1210 or the second memory 1220. Generally, a part of the sample layer is directly extracted during the sample extraction. Therefore, in the sample layers of the first memory 1210 and the second memory 1220, a molecular number ratio between the first sample and the second sample needs to be kept the same as that between the first sample and the second sample that are not extracted.

Illustratively, the first sample is a single-molecule sample with a molecular mass greater than that of the second sample. If the first sample and the second sample are preserved at a same rotating speed, because the molecular mass of the first sample is greater than that of the second sample, the first sample preserved in the first memory 1210 at the same rotating speed is more likely to be enriched in the sample layer under the action of centrifugal force, thereby resulting in the ratio of the molecular number of the first sample to that of the second sample being different from the ratio of the molecular number of the first sample to that of the second sample in the target solvent.

It should be noted that the controller 1300 can obtain the relative molecular mass of the first sample and that of the second sample from a database or by connecting to a corresponding measuring device, and a specific obtaining method is not limited here.

In some feasible embodiments, the first sample collector 1110 includes a housing 1111 and a liquid inlet pipe 1113, an absorption chamber 1112 for storing a solvent is formed in the housing 1111, the liquid inlet pipe 1113 is communicated with the target solvent and the absorption chamber 1112, the liquid inlet pipe 1113 includes a dispersion part 1114, and the dispersion part 1114 is located in the absorption chamber 1112.

It can be understood that in the embodiment, the first sample collector 1110 can perform collection by an enrichment sampling method via a specific solution. The target solvent can be led to a specific sampling solvent through the liquid inlet pipe 1113, such that the first sample can be retained in the sampling solvent. The dispersion part 1114 being arranged in the absorption chamber 1112 can further cause the first sample to be relatively uniformly diffused, which improves the absorption efficiency of a specific solvent.

In some feasible embodiments, the sampling device further includes a negative pressure device, and the negative pressure device includes a liquid suction pipe 1115, and the liquid suction pipe 1115 is communicated with the absorption chamber 1112.

It can be understood that negative pressure device can form a negative pressure in the absorption chamber 1112, such that the target solvent can enter the absorption chamber 1112. In this application, the negative pressure device may include a vacuum bottle or a vacuum pump. This is not specifically limited herein.

In some feasible embodiments, the first memory 1210 includes a plurality of first storage bins 1211 and a first rotary table 1212, where the plurality of first storage bins 1211 are uniformly spaced on an edge of the first rotary table 1212, and each of the first storage bins 1211 is selectively communicated with the first sample collector 1110; and the second memory 1220 includes a plurality of second storage bins 1221 and a second rotary table 1222, where the plurality of second storage bins 1221 are uniformly spaced on an edge of the second rotary table 1222, and each of the second storage bins 1221 is selectively communicated with the second sample collector 1120.

In some feasible embodiments, the controller 1300 is also used for controlling connection of the first storage bin 1211 and the first sample collector 1110; and when the mass fraction of the first sample in a solvent in the absorption chamber 1112 reaches a preset threshold, the controller 1300 controls separation of the first storage bin 1211 from the first sample collector 1110.

It can be understood that when the mass fraction of a first sample in one of the first storage bins 1211 reaches a preset threshold, this means that the first sample therein has been preserved, and a next first storage bin 1211 can be replaced under the control of the controller 1300 to continue sampling.

In the embodiment, the first memory 1210 includes a first servo motor, the first servo motor is in transmission connection with the first rotary table 1212, and the controller 1300 is used for controlling the rotating speed of the first servo motor; and the second memory 1220 includes a second servo motor, the second servo motor is in transmission connection with the second rotary table 1222, and the controller 1300 is also used for controlling the rotating speed of the second servo motor.

It can be understood that in the embodiment, the rotation of two rotary tables is controlled through two different servo motors, which can separately adjust the rotating speeds of the two rotary tables.

Specifically, the diameter of the first rotary table 1212 is the same as that of the second rotary table 1222, the ratio of the relative molecular mass of the first sample to that of the second sample is N, and the ratio of the rotating speed of the first rotary table 1212 to that of the second rotary table 1222 is 1/N.

For the sampling device and sample storage device 1000 suitable for a single molecule provided in the embodiment, the first sample collector 1110 and the second sample collector 1120 can collect two different samples, and the first sample and the second sample are preserved in the first memory 1210 and the second memory 1220, respectively. The controller 1300 controls the rotating speed of the first memory 1210 and that of the second memory 1220, such that the first memory and the second memory have different centrifugal speeds for different samples. A proportional relationship between the first sample and the second sample is saved while the samples are retained.

Embodiment 2

Refer to FIG. 1. A sampling device and sample storage device 1000 suitable for a single molecule is provided in this application, and includes:
a sample collector 1100, where the sample collector 1100 is used for collecting a single-molecule sample from a target solvent, and the sample collector 1100 includes a first sample collector 1110 and a second sample collector 1120, where the first sample collector 1110 is used for collecting a first sample, the second sample collector 1120 is used for collecting a second sample, and the relative molecular mass of the first sample is different from that of the second sample;
the sample storage device 1200, where the sample storage device 1200 is used for storing the single-molecule sample 1100 collected by the sample collector, the sample storage device 1200 includes a first memory 1210 and a second memory 1220 that are capable to rotate, where the first memory 1210 is connected to the first sample collector 1110 and used for storing the first sample, and the second memory 1220 is connected to the second sample collector 1120 and used for storing the second sample; and
a controller 1300, where the controller 1300 is used for obtaining the relative molecular mass of the first sample and that of the second sample, and controlling the rotating speed of the first memory 1210 and that of the second memory 1220 according to the relative molecular mass of the first sample and that of the second sample.

It can be understood that in this application, the first sample collector 1110 and the second sample collector 1120 can collect two different samples, and the first sample and the second sample are preserved in the first memory 1210 and the second memory 1220, respectively. The controller 1300 controls the rotating speed of the first memory 1210 and that of the second memory 1220, such that the first memory and the second memory have different centrifugal speeds for different samples. A proportional relationship between the first sample and the second sample is saved while the samples are retained.

It should be noted that the controller 1300 can obtain the relative molecular mass of the first sample and that of the second sample from a database or by connecting to a corresponding measuring device, and a specific obtaining method is not limited here.

Figure 2:
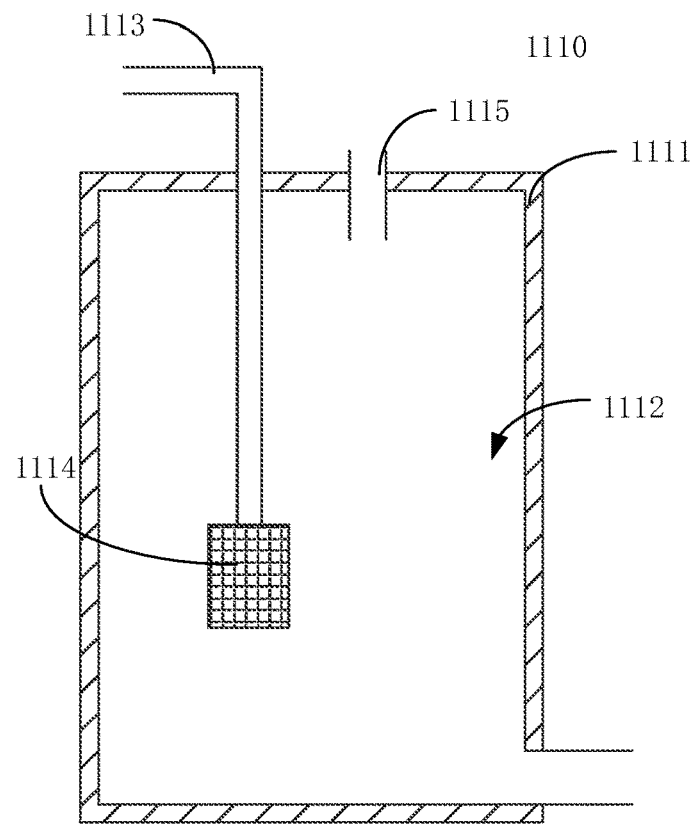
FIG. 2 is a structural section view of a first sample collector in a sampling device and sample storage device suitable for a single molecule according to an embodiment of this application.

Refer to FIG. 2. In some feasible embodiments, the first sample collector 1110 includes a housing 1111 and a liquid inlet pipe 1113, an absorption chamber 1112 for storing a solvent is formed in the housing 1111, the liquid inlet pipe 1113 is communicated with the target solvent and the absorption chamber 1112, the liquid inlet pipe 1113 includes a dispersion part 1114, and the dispersion part 1114 is located in the absorption chamber 1112.

It can be understood that in the embodiment, the first sample collector 1110 can perform collection by an enrichment sampling method via a specific solution. The target solvent can be led to a specific sampling solvent through the liquid inlet pipe 1113, such that the first sample can be retained in the sampling solvent. The dispersion part 1114 being arranged in the absorption chamber 1112 can further cause the first sample to be relatively uniformly diffused, which improves the absorption efficiency of a specific solvent.

In some feasible embodiments, the sampling device further includes a negative pressure device, and the negative pressure device includes a liquid suction pipe 1115, and the liquid suction pipe 1115 is communicated with the absorption chamber 1112.

It can be understood that negative pressure device can form a negative pressure in the absorption chamber 1112, such that the target solvent can enter the absorption chamber 1112. In this application, the negative pressure device may include a vacuum bottle or a vacuum pump. This is not specifically limited herein.

It should be noted that the structure of the first sample collector 1110 is approximately the same as that of the second sample collector 1120. This is not limited herein.

Figure 3:
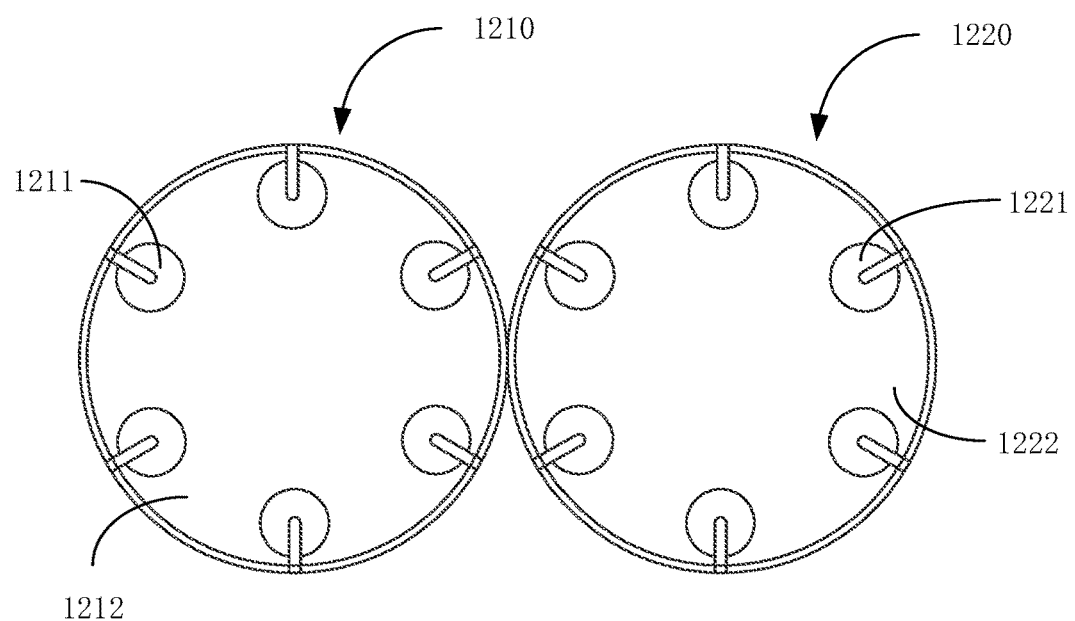
FIG. 3 is a structural schematic diagram of a sample storage device suitable for a single molecule in a sampling device and sample storage device suitable for a single molecule according to an embodiment of this application.

Refer to FIG. 3. In some feasible embodiments, the first memory 1210 includes a plurality of first storage bins 1211 and a first rotary table 1212, where the plurality of first storage bins 1211 are uniformly spaced on an edge of the first rotary table 1212, and each of the first storage bins 1211 is selectively communicated with the first sample collector 1110; and the second memory 1220 includes a plurality of second storage bins 1221 and a second rotary table 1222, where the plurality of second storage bins 1221 are uniformly spaced on an edge of the second rotary table 1222, and each of the second storage bins 1221 is selectively communicated with the second sample collector 1120.

In some feasible embodiments, the controller 1300 is also used for controlling connection of the first storage bin 1211 and the first sample collector 1110; and when the mass fraction of the first sample in a solvent in the absorption chamber 1112 reaches a preset threshold, the controller 1300 controls separation of the first storage bin 1211 from the first sample collector 1110.

It can be understood that when the mass fraction of a first sample in one of the first storage bins 1211 reaches a preset threshold, this means that the first sample therein has been preserved, and a next first storage bin 1211 can be replaced under the control of the controller 1300 to continue sampling.

In the embodiment, the sampling device and sample storage device 1200 further includes:
- a driving motor, where the driving motor is in transmission connection with the first rotary table 1212; and
- a transmission structure, where the transmission structure includes an input end and an output end, the input end is in transmission connection with the first rotary table 1212 and the output end is in transmission connection with the second rotary table 1222, and the controller 1300 is also used for controlling the transmission ratio of the output end to the input end.

In some feasible embodiments, the ratio of the relative molecular mass of the first sample to that of the second sample is N, the transmission ratio of the output end to the input end is 1/1, and the ratio of the rotating speed of the first rotary table 1212 to that of the second rotary table 1222 is 1/N.

In some feasible embodiments, the diameter of the first rotary table 1212 is the same as that of the second rotary table 1222, the ratio of the relative molecular mass of the first sample to that of the second sample is N, and the transmission ratio of the input end to the output end is 1/N.

For the sampling device and sample storage device 1000 suitable for a single molecule provided in the embodiment, the first sample collector 1110 and the second sample collector 1120 can collect two different samples, and the first sample and the second sample are preserved in the first memory 1210 and the second memory 1220, respectively. The controller 1300 controls the rotating speed of the first memory 1210 and that of the second memory 1220, such that the first memory and the second memory have different centrifugal speeds for different samples. A proportional relationship between the first sample and the second sample is saved while the samples are retained.

The sampling device and sample storage device 1000 suitable for a single molecule provided in this application is described in detail above. The principles and the embodiments of this application are described in this specification by using specific examples. The foregoing descriptions about the embodiments are merely provided to help understand the core idea of this application for the sampling device 1000 and sample storage device suitable for a single molecule. In addition, a person of ordinary skill in the art can make changes to the specific embodiments and the application scope according to the idea of this application. Therefore, the content of this specification shall not be construed as a limitation on this application.

The sampling device and sample storage device 1000 suitable for a single molecule provided in this application is described in detail above. The principles and the embodiments of this application are described in this specification by using specific examples. The foregoing descriptions about the embodiments are merely provided to help understand the core idea of this application for the sampling device 1000 and sample storage device suitable for a single molecule. In addition, a person of ordinary skill in the art can make changes to the specific embodiments and the application scope according to the idea of this application. Therefore, the content of this specification shall not be construed as a limitation on this application.

The invention claimed is:

1. A sampling device and sample storage device suitable for a single molecule, comprising:
   a sample collector, wherein the sample collector is used for collecting a single-molecule sample from a target solvent, and the sample collector comprises a first sample collector and a second sample collector, wherein the first sample collector is configured to collect a first sample, the second sample collector is configured to collect a second sample, and a relative molecular mass of the first sample is different from a relative molecular mass of the second sample;
   the first sample collector comprises a housing and a liquid inlet pipe, an absorption chamber configured to store a solvent is formed in the housing, the liquid inlet pipe is communicated with the target solvent and the absorption chamber, the liquid inlet pipe comprises a dispersion part, and the dispersion part is located in the absorption chamber;
   a sample storage device, wherein the sample storage device is configured to store the single-molecule sample collected by the sample collector, the sample storage device comprises a first memory and a second memory that are capable to rotate, wherein the first memory is connected to the first sample collector and configured to store the first sample, and the second memory is connected to the second sample collector and configured to store the second sample; and
   a controller, wherein the controller is configured to obtain the relative molecular mass of the first sample and the relative molecular mass of the second sample, and controlling a rotating speed of the first memory and a rotating speed of the second memory according to the relative molecular mass of the first sample and the relative molecular mass of the second sample.

2. The sampling device and sample storage device suitable for a single molecule according to claim 1, wherein the sampling device further comprises a negative pressure device, and the negative pressure device comprises a liquid suction pipe, and the liquid suction pipe is in communication with the absorption chamber.

3. The sampling device and sample storage device suitable for a single molecule according to claim 2, wherein the first memory comprises a plurality of first storage bins and a first rotary table, wherein the plurality of first storage bins are uniformly spaced on an edge of the first rotary table, and each of the first storage bins is selectively communicated with the first sample collector; and the second memory comprises a plurality of second storage bins and a second rotary table, wherein the plurality of second storage bins are uniformly spaced on an edge of the second rotary table, and each of the second storage bins is selectively communicated with the second sample collector.

4. The sampling device and sample storage device suitable for a single molecule according to claim 3, wherein the controller is configured to control connection of the first storage bin and the first sample collector; and when a mass fraction of the first sample in a solvent in the absorption chamber reaches a preset threshold, the controller controls separation of a first storage bin from the first sample collector.

5. The sampling device and sample storage device suitable for a single molecule according to claim 4, wherein the first memory comprises a first servo motor, the first servo motor is in transmission connection with the first rotary table, and the controller is configured to control a rotating speed of the first servo motor; and the second memory comprises a second servo motor, the second servo motor is in transmission connection with the second rotary table, and the controller is configured to control a rotating speed of the second servo motor.

6. The sampling device and sample storage device suitable for a single molecule according to claim 5, wherein a diameter of the first rotary table is the same as a diameter of the second rotary table, a ratio of the relative molecular mass of the first sample to the relative molecular mass of the second sample is N, and a ratio of a rotating speed of the first rotary table to a rotating speed of the second rotary table is 1/N.

7. The sampling device and sample storage device suitable for a single molecule according to claim 4, further comprising: a driving motor, wherein the driving motor is in transmission connection with the first rotary table; and a transmission structure, wherein the transmission structure comprises an input end and an output end, the input end is in transmission connection with the first rotary table and the output end is in transmission connection with the second rotary table, and the controller is configured to control a transmission ratio of the output end to the input end.

8. The sampling device and sample storage device suitable for a single molecule according to claim 7, wherein the ratio of the relative molecular mass of the first sample to the relative molecular mass of the second sample is N, the transmission ratio of the output end to the input end is 1/1, and a ratio of a rotating speed of the first rotary table to a rotating speed of the second rotary table is 1/N.

9. The sampling device and sample storage device suitable for a single molecule according to claim 7, wherein a diameter of the first rotary table is the same as a diameter of the second rotary table, a ratio of the relative molecular mass of the first sample to the relative molecular of the second sample is N, and the transmission ratio of the input end to the output end is 1/N.

\* \* \* \* \*